INVENTOR.
CLARENCE O. GLASGOW
BY
Dunlap, Laney & Hubbard
ATTORNEY

United States Patent Office 3,199,312
Patented Aug. 10, 1965

3,199,312
TORQUE COUPLING AND SAFETY CLUTCH DEVICE
Clarence O. Glasgow, P.O. Box 2181, Tulsa, Okla.
Filed Feb. 25, 1963, Ser. No. 260,370
7 Claims. (Cl. 64—11)

The present invention relates to the art of transmitting torque from a driver shaft to a driven shaft, and more particularly, but not by way of limitation, relates to an improved flexible torque coupling and safety clutch device for interconnecting two generally aligned, rotating shafts.

There are many situations in which it is necessary to connect the rotating drive shaft of a prime mover, such as an electric motor, to the rotating power input shaft of a machine, such as a pump. In most cases the prime mover and machine are mounted on a common base with suitable provisions being made for adjusting the position of either the prime mover or the machine, or both, so that the two shafts may be generally aligned and interconnected by a so-called torque coupling. Before the two shafts can be rigidly interconnected, the shafts must be precisely aligned or severe forces will be exerted on both the torque coupling and the shaft bearings of the prime mover and machine as the shafts rotate.

Many types of flexible torque couplings have been devised for relieving the forces imposed upon the bearings when the shafts are disaligned. In general, these torque couplings have intermeshing fingers or similar intermeshing structures which are covered and interconnected by rubber or other resilient material so as to permit flexing of the coupling. Couplings of this type operate satisfactorily but are, in general, relatively complex and expensive. Further, it is believed that previously known torque couplings provide a positive interconnect so as to transmit torque until the coupling or some part of the prime mover or machine fails in the event of a malfunction.

Therefore it is an important object of the present invention to provide an improved torque coupling for interconnecting two generally aligned, rotating shafts. The torque coupling and safety clutch device constructed in accordance with the present invention comprises, in general, first and second members having similar peripheral surfaces disposed around axes of rotation, means at the axis of rotation of each member for coupling the member to one of the shafts with the peripheral surface disposed generally in a plane normal to the shaft, and a resilient sleeve member disposed around and frictionally engaging the peripheral surfaces of the first and second members whereby torque will be transmitted from one member to the other member through the resilient sleeve.

Another object of the present invention is to provide a flexible torque coupling which will also act as a safety clutch in the event the driven machine becomes jammed or otherwise freezes and the torque load on the coupling exceeds a predetermined value.

Still another object of the present invention is to provide a flexible torque coupling and safety clutch device of the type described which may be very economically manufactured.

Yet another object of the present invention is to provide a flexible torque coupling and safety clutch device of the type described which may be very easily assembled and installed.

A still further object of the present invention is to provide a flexible torque coupling and safety clutch device of the type described which will absorb and cushion torsional shocks and jolts transmitted through either of the interconnected shafts.

Still another object of the present invention is to provide a novel flexible sleeve which may be used in combination with two conventional V-belt or similar pulleys to produce a flexible torque coupling and safety clutch device in accordance with the present invention.

Many additional objects and advantages of the present invention will be evident to those skilled in the art from the following detailed description and drawings, wherein.

Figure 2:
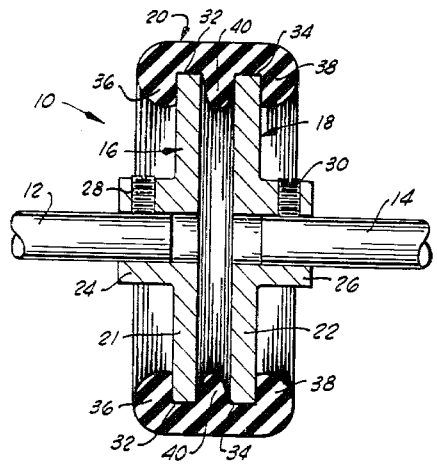
FIG. 2 is a longitudinal sectional view through a device constructed in accordance with the present invention.
Figure 1:
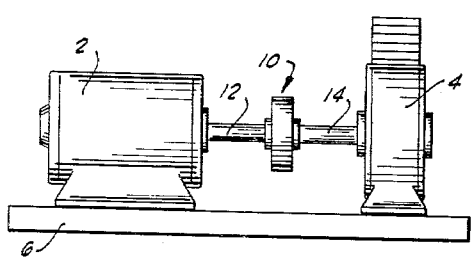
FIG. 1 is a side elevational view showing a device constructed in accordance with the present invention interconnecting a prime mover and a pump, and serves to illustrate a typical application of the devices shown in FIGS. 2–5.

Referring now to the drawings, and in particular to FIG. 1, a prime mover 2, such as an electric motor, and a driven device such as a pump 4, are connected to a common base 6 by any suitable means. A flexible torque coupling and safety clutch device constructed in accordance with the present invention is indicated generally by the reference numeral 10 and is used to interconnect the drive shaft 12 of the prime mover 2 and the power input shaft 14 of the pump 4. Referring now to FIG. 2, the flexible torque coupling and safety clutch device 10 comprises a first disc member, indicated generally by the reference numeral 16, a second disc member, indicated generally by the reference numeral 18, and a flexible sleeve member, indicated generally by the reference numeral 20.

The members 16 and 18 are preferably identical and therefore interchangeable and comprise two circular discs 21 and 22, respectively, which have tubular sleeves 24 and 26 disposed at the axis of rotation of the respective disc for receiving the shafts 12 and 14. Suitable set screws 28 and 30 may be threaded through the sleeves 24 and 26 into contact with the shafts 12 and 14 to connect the members 16 and 18 to the shafts in the conventional manner. The members 16 and 18 have peripheral surfaces of revolution 32 and 34 about the axes of rotation of the respective members, which of course correspond to the axes of rotation of the shafts 12 and 14.

The sleeve member 20 is molded from a resilient material such as synthetic rubber and, when in an unstretched state, has a diameter substantially less than the diameter of the surfaces of revolution 32 and 34. The sleeve member 20 has two annular, inwardly facing, spaced grooves (not referenced) for receiving the peripheral edges of the disc members 16 and 18, the annular grooves being formed by three inwardly projecting annular ridges 36, 38 and 40 which project radially inwardly from a web portion 42. Thus it will be noted that when the resilient sleeve 20 is stretched over the surfaces of revolution 32 and 34 of the members 16 and 18, the resilient sleeve will be stretched tightly against and frictionally engage the peripheral surfaces in order to transmit torque from one disc member to the other. However, if the torque exceeds the frictional coupling force between the sleeve and either of the peripheral surfaces, the sleeve will slide on the surface and thereby function as a safety clutch. The sleeve 20 is secured against longitudinal or axial displacement by the inwardly projecting annular ridges 36, 38 and 40, or stated in other words, by reason of the fact that the peripheral edges of the respective disc members 16 and 18 are received in the two spaced annular grooves of the sleeve 20. In this respect, it will be noted that only the center annular ridge 40 will be sufficient to maintain the sleeve 20 properly positioned on the members 16 and 18 so long as the spacing between the members 16 and 18 is positively established by the relative positions of the shafts 12 and 14. Similarly, only the outer two inwardly projecting annular ridges 36 and 38 will maintain the sleeve 20 properly positioned so long as the spacing between the members 16 and 18 is positively controlled. However, in situations where one or more of the shafts 12 or 14 is not rigidly fixed, all three ridges 36, 38 and 40 are preferred in order to insure that the sleeve 20 is maintained in proper position and to assist in maintaining the members 16 and 18 properly spaced. Further, it will be evident that the center ridge 40 will prevent direct contact between the two rotating members 16 and 18.

Figure 3:
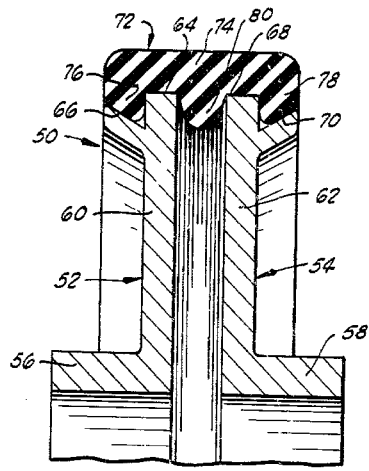
FIG. 3 is a half-longitudinal sectional view through another device constructed in accordance with the present invention.

Another flexible torque coupling and safety clutch device constructed in accordance with the present invention is indicated generally by the reference numeral 50 and is illustrated in FIG. 3. The device 50 is substantially identical to the device of FIG. 2, and has a pair of disc members 52 and 54 having sleeves 56 and 58, respectively, at the axis of rotation for connecting the disc members to two generally aligned, rotating shafts, such as the shafts 12 and 14. The disc members 52 and 54 have annular disc portions 60 and 62, respectively, each of which has two surfaces of revolution about the axis of revolution of the respective member. Thus it will be noted that the member 52 has a first surface of revolution 64 and a second surface of revolution 66. The first surface of revolution 64 is substantially cylindrical while the second surface of revolution 66 is of smaller diameter and is frusto-conical in shape. The member 54 similarly has a first surface of revolution 68 and a second surface of revolution 70 corresponding to the surfaces of revolution 64 and 66, respectively. Thus it will be noted that the two outer surfaces of revolution 66 and 70 are of smaller diameter than the two interior surfaces of revolution 64 and 68.

A sleeve member, indicated generally by the reference numeral 72, is substantially identical to the sleeve member 20 and has a web portion 74, and two inwardly facing annular grooves (not referenced) formed by three inwardly projecting circumferential ridge portions 76, 78 and 80. The sleeve member 72 has, when not stretched over the members 52 and 54, a smaller diameter than that of the members 52 and 54, and when stretched around the members 52 and 54 is in circumferential frictional engagement with the surfaces of revolution 64, 66, 68 and 70 and serves to transmit torque from one of the members 52 or 54 to the other, as previously described in connection with the device 10. However, when the torque becomes excessive, one of the disc members will slip within the sleeve and thereby function as a safety clutch to prevent damage to either the prime mover or the machine being driven. The combination of grooves and inwardly projecting circumferential ridges 76, 78 and 80 serve to prevent longitudinal or axial slippage of the sleeve member 72 on the disc members 52 and 54. The primary difference between the device 50 and the device 10 is that the innermost edges of the inwardly projecting ridges 76 and 78 frictionally engage the surfaces of revolution 66 and 70 to increase the surfaces which are in frictional contact and thereby transmit a greater torque for a given tension in the sleeve 72, without increasing the length of the sleeve. It will be evident to those skilled in the art that the dimensions of the annular ridges 76 and 78 should be selected so as to insure uniform contact with the four surfaces of revolution 64, 66, 68 and 70.

Figure 4:
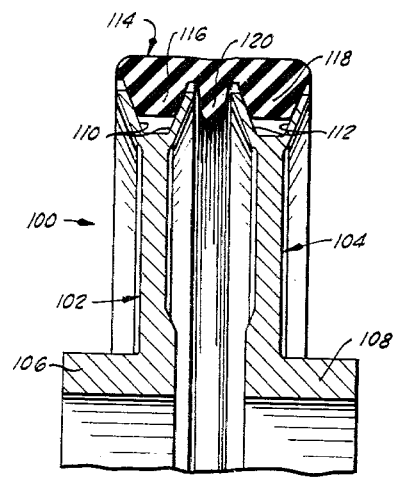
FIG. 4 is a half-longitudinal sectional view of still another device constructed in accordance with the present invention; and, FIG. 5 is a half-longitudinal sectional view of yet another device constructed in accordance with the present invention.

Referring now to FIG. 4, another flexible torque coupling and safety clutch device constructed in accordance with the present invention is indicated generally by the reference numeral 100. The device 100 is comprised of two substantially identical and preferably interchangeable rotating disc members 102 and 104. In practice, the disc members 102 and 104 may comprise standard V-belt sheaves having tubular sleeves 106 and 108, respectively, for connecting the sheaves to a pair of generally aligned, rotating shafts, such as the shafts 12 and 14. Each of the sheaves 102 and 104 has a pair of diverging surfaces of revolution 110 and 112 about the axis of rotation of the respective sheave. A resilient sleeve 114 molded from a suitable resilient material, such as rubber, has two inwardly projecting annular ridge portions 116 and 118 for engaging surfaces of revolution 110 and 112, respectively. As in the case of the sleeves 20 and 72 described above, the sleeve 114, when not stretched over the sheaves, has a diameter somewhat less than the diameters of the surfaces of revolution 110 and 112. The annular ridges 116 and 118 preferably have two annular faces which converge at the same angle the faces 110 and 112 diverge so as to uniformly mate with and frictionally engage the surfaces of revolution in order to transmit torque as previously described.

Thus it will be noted that the annular, inwardly projecting ridges 116 and 118 in conjunction with the groove formed by the diverging surfaces of revolution 110 and 112 serve to prevent longitudinal slippage of the sleeve 114 relative to the members 102 and 104. As mentioned, the sleeve 114 has a diameter, when not stretched over the members 102 and 104, less than the diameter of the surfaces of revolution 110 and 112, so that when the sleeve 114 is stretched around the members 102 and 104 with the annular projections 116 and 118 extending into the grooves formed by the diverging surfaces of revolution 110 and 112, the tension force of the sleeve 114 will tend to wedge the projections 116 and 118 between the corresponding surfaces of revolution 110 and 112. Of course this will amplify the forces normal to the contacting surfaces and thereby substantially increase the frictional coupling between the sleeve 114 and the disc members 102 and 104.

If desired, the sleeve 114 may be provided with a third inwardly projecting annular ridge 120. The center ridge portion 120 assists in maintaining the sleeve member 114 properly positioned longitudinally or axially on the sheaves 102 and 104 in the same manner as the center ridge portions 40 and 80 of the devices 10 and 50, respectively. The center ridge 120 also serves to strengthen the web or body of the sleeve 114 and thereby stiffens the sleeve.

Figure 5:
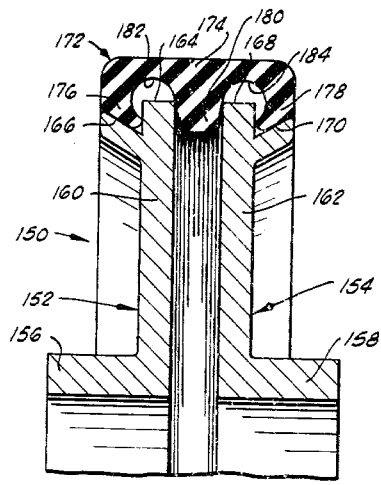

Referring now to FIG. 5, another torque coupling and safety clutch device constructed in accordance with the present invention is indicated generally by the reference numeral 150. The device 150 is comprised of two disc members 152 and 154 which are preferably of identical construction so as to be interchangeable, and which may be identical to the disc members 52 and 54 of the device 50. Accordingly, the disc members 152 and 154 have tubular sleeve portions 156 and 158, respectively, disposed at the axes of rotation for connecting the respective members to a pair of generally aligned rotating shafts (not illustrated), such as the shafts 12 and 14. The disc members 152 and 154 have disc portions 160 and 162, respectively. The disc portion 160 has a first surface of revolution 164 and a second surface of revolution 166 of smaller diameter, and the disc portion 162 has similar surfaces of revolution 168 and 170.

A sleeve member, indicated generally by the reference numeral 172, is fabricated from molded synthetic rubber or other resilient material and has a generally cylindrical web portion 174 from which three annular ridge portions 176, 178 and 180 project inwardly. The outer two annular ridges 176 and 178 frictionally engage the surfaces 166 and 170, respectively, in order to transmit torque through the device, while the center annular ridge portion 180 extends between the interior surfaces of revolution 164 and 168. It will be noted that grooves 182 and 184 are formed between the three annular ridges which are of such a depth as not to contact the surfaces of revolution 164 and 168, such that only the outer annular ridges 176 and 178 are in circumferential frictional engagement with the surfaces of revolution 166 and 170 of the disc members 152 and 154. The device 150 operates in substantially the same manner as the devices 10, 50 and 100, except that the construction of the inwardly directed annular ridges 176 and 178 provides considerably greater flexibility for the coupling while the larger center projection 180 insures that the sleeve member 172 remains in proper position, and also insures that the disc members 152 and 154 do not come into harmful contact. At the same time the outer annular ridges 176 and 178 prevent either of the disc members 152 and 154 from slipping longitudinally out of the sleeve member 172.

From the above detailed descriptions of several preferred embodiments of the present invention, it will be evident that a highly useful torque coupling and safety device has been disclosed. When used to interconnect two generally aligned, rotating shafts, the flexible sleeves will transmit torque from one disc member to the other by means of friction without inducing undesirable forces on the bearings supporting the shafts even though the shafts are permanently disaligned or one of the shafts is floating to a limited extent relative to the other. However, when the torque becomes excessive, as would be the case when the machine being driven locks or becomes otherwise inoperative, the peripheral surfaces of revolution of the disc members permit one of the disc members to rotate within the sleeve and function as a safety clutch in order to prevent further damage to the driven machine or to the prime mover. In this regard, it will be appreciated that the magnitude of torque which can be transmitted by the coupling is dependent entirely upon friction and accordingly will be a function of the contact area between each disc member and the sleeve, the surface properties of the sleeve and disc members, and the force with which the sleeve is pressed against the peripheral surfaces of the disc members, which force will be determined by the tension in the sleeve and the cross sectional configuration of the sleeve and peripheral surfaces.

It will be further apparent that in each of the illustrated embodiments of the torque coupling device, means is provided to prevent axial slippage of the sleeve member relative to the disc members, and to prevent axial convergence of the coupled shafts and their associated disc members to the point of contact. In all embodiments, this means takes the general form of mating protuberances and depressions formed in the sleeve member and on the disc members.

It will be evident to those skilled in the art that the torque coupling and safety clutch devices can be very economically manufactured because the sleeves can be easily molded from synthetic rubber and the disc members can be cast or otherwise formed from any suitable metal. Further, the coupling device 100 can be manufactured merely by molding the sleeve 114 and employing standard V-belt sheaves. Thus it will be evident that the sleeve 114 can be marketed as a separate item for use in combination with the standard sheaves. Although interchangeability of parts and simplified production can be attained by using two idential disc members, it will also be appreciated by those skilled in the art that the flexible sleeves of the various couplings could be rigidly connected to one of the disc members and still provide slippage between the sleeve and the other disc member in the event the torque becomes excessive.

Although several preferred embodiments of the present invention have been described in detail, it is to be understood that various changes and substitutions can be made therein without departing from the spirit and scope of the present invention as defined by the appended claims.

What is claimed is:

1. A flexible torque coupling and safety clutch device for interconnecting two generally aligned rotating shafts, the device comprising:
   first and second disc-shaped members each having an axis of rotation and a peripheral surface of revolution about the axis of rotation;
   an annular resilient sleeve member disposed around and frictionally engaging the surface of revolution of each of the disc members, said resilient sleeve member being an integrally molded, unitary structure having a smaller diameter in its relaxed, unstressed state than its diameter when disposed around said disc members, said sleeve member having a pair of axially spaced, circumferential grooves in the interior surface of the sleeve member for receiving the surfaces of revolution of the disc members for preventing axial slippage of the sleeve member relative to either of the disc members while permitting rotational slippage when a certain torque is exceeded; and
   means at the axis of rotation of each of the disc members for connecting each of the disc members to one of the shafts.

2. A flexible torque coupling and safety clutch device for interconnecting two generally aligned rotating shafts, the device comprising:
   first and second disc-shaped members each having an axis of rotation and a peripheral surface of revolution about the axis of rotation;
   an annular resilient sleeve member disposed around and frictionally engaging the surface of revolution of each of the disc members, said resilient sleeve member being an integrally molded, unitary structure having a smaller diameter in its relaxed, unstressed state than its diameter when disposed around said disc members;
   a circumferential ridge extending radially inwardly from the interior of the sleeve member and positioned between the surfaces of revolution of said disc members to prevent relative axial movement of said disc members into contact with each other while permitting rotational slippage when a certain torque is exceeded; and
   means at the axis of rotation of each of the disc members for connecting each of the disc members to one of the shafts.

3. A flexible torque coupling and safety clutch device for interconnecting two generally aligned rotating shafts, the device comprising:
   first and second disc-shaped members each having an axis of rotation and a peripheral surface of revolution about the axis of rotation;
   an annular resilient sleeve member disposed around and frictionally engaging the surface of revolution of each of the disc members, said resilient sleeve member being an integrally molded, unitary structure having a smaller diameter in its relaxed, unstressed state than its diameter when disposed around said disc members;
   mating protuberances and depressions on said disc-shaped members and said annular resilient sleeve member for preventing axial slippage of the sleeve member relative to either of the disc members while permitting rotational slippage when a certain torque is exceeded; and
   means at the axis of rotation of each of the disc members for connecting each of the disc members to one of the shafts.

4. A flexible torque coupling and safety clutch device for interconnecting two generally aligned rotating shafts, the device comprising:
   first and second disc-shaped members each having an axis of rotation and two diverging surfaces of revolution about the axis of rotation:

an annular resilient sleeve member having a pair of spaced, inwardly extending circumferential ridges, each ridge being disposed between and frictionally engaging the two diverging surfaces of revolution, said resilient sleeve member being an integrally molded, unitary structure having a smaller diameter in its relaxed, unstressed state than its diameter when disposed around and in frictional engagement with said two diverging surfaces of revolution; and means at the axis of rotation of each of the disc-shaped members for connecting each of the disc-shaped members to one of the shafts.

5. A flexible torque coupling and safety clutch device for interconnecting two generally aligned rotating shafts, the device comprising:

first and second disc-shaped members each having an axis of rotation and two surfaces of revolution about the axis of rotation, the disc-shaped members being disposed in spaced, generally parallel relationship with the axes of rotation generally aligned, the surface of revolution on each member more remote from the other member being of smaller diameter than the other surface of revolution:

an annular resilient sleeve member disposed around and frictionally engaging the four surfaces of revolution, said resilient sleeve being an integrally molded, unitary structure having a smaller diameter in its relaxed, unstressed state than its diameter when disposed around said four surfaces of revolution; and means at the axis of rotation of each of the disc-shaped members for connecting each of the disc-shaped members to one of the shafts.

6. A flexible torque coupling and safety clutch device for interconnecting two generally aligned rotating shafts, the device comprising:

first and second disc-shaped members each having an axis of rotation and two surfaces of revolution about the axis of rotation, the disc-shaped members being disposed in spaced, generally parallel relationship with the axes of rotation generally aligned, the surface of revolution on each member more remote from the other member being of smaller diameter than the other surface of revoluton;

a resilient sleeve member having three spaced, inwardly extending, circumerential ridges, the two outer ridges being in circumferential, frictional engagement with the surfaces of revolution of smaller diameter and the center ridge being disposed between the other two surfaces of revolution; and, means at the axis of rotation of each of the disc-shaped members for connecting each of the disc-shaped members to one of the shafts.

7. A coupling for drivingly connecting two circular, disc-shaped members secured to axially aligned shafts for rotation therewith, and spaced apart from each other along the rotational axes of said shafts, said coupling comprising an integrally molded, unitary annular resilient sleeve adapted to surround and frictionally engage said disc-shaped members, and having a smaller diameter in its relaxed, unstressed state than its diameter when disposed around and in frictional engagement with said disc-shaped members, said annular sleeve including a web portion, and three axially spaced, radially inwardly projecting ridges defining a pair of annular grooves for receiving said disc-shaped members and for frictionally engaging the opposed radial surfaces of each of said disc-shaped members, the centrally located of said axially spaced, radially inwardly projecting ridges being dimensioned to fill the axial space between said disc-shaped members when said coupling is positioned around and in frictional engagement with said disc-shaped members whereby said disc-shaped members are prevented by said centrally located, inwardly projecting ridge from contacting each other during rotation of said shafts.

References Cited by the Examiner

UNITED STATES PATENTS

| | | | |
|---|---|---|---|
| 1,847,882 | 3/32 | Lorig | 64—30 |
| 1,887,876 | 11/32 | Noble | 64—11 |
| 2,186,305 | 1/40 | Orr | 64—11 |
| 3,063,261 | 11/62 | Sorenson | 64—11 |

ROBERT C. RIORDON, *Primary Examiner.*